(12) United States Patent
Gudme

(10) Patent No.: US 8,056,585 B2
(45) Date of Patent: Nov. 15, 2011

(54) FLEXIBLE PIPE

(75) Inventor: Jonas Gudme, Rødovre (DK)

(73) Assignee: NKT Flexibles I/S, Brondby (DK)

( * ) Notice: Subject to any disclaimer, the term of this patent is extended or adjusted under 35 U.S.C. 154(b) by 222 days.

(21) Appl. No.: 12/520,677

(22) PCT Filed: Dec. 17, 2007

(86) PCT No.: PCT/DK2007/050187
§ 371 (c)(1),
(2), (4) Date: Jun. 22, 2009

(87) PCT Pub. No.: WO2008/077409
PCT Pub. Date: Jul. 3, 2008

(65) Prior Publication Data
US 2010/0059134 A1    Mar. 11, 2010

(30) Foreign Application Priority Data

Dec. 22, 2006   (DK) .................................. 2006 01706

(51) Int. Cl.
*F16L 11/16*   (2006.01)

(52) U.S. Cl. ......................... 138/135; 138/134; 138/127

(58) Field of Classification Search .......... 138/134–136, 138/129, 150
See application file for complete search history.

(56) References Cited

U.S. PATENT DOCUMENTS

| | | | |
|---|---|---|---|
| 3,340,900 A | 9/1967 | Spurlock | 138/136 |
| 4,549,581 A | 10/1985 | Unno et al. | 138/109 |
| 5,343,738 A | 9/1994 | Skaggs | 73/40.5 R |
| 5,669,420 A * | 9/1997 | Herrero et al. | 138/135 |
| 5,730,188 A | 3/1998 | Kalman et al. | 138/135 |
| 5,813,439 A | 9/1998 | Herrero et al. | 138/134 |
| 6,024,135 A | 2/2000 | Nobileau | 138/134 |
| 6,065,501 A | 5/2000 | Feret et al. | 138/134 |
| 6,085,799 A | 7/2000 | Kodaissi et al. | 138/135 |
| 6,110,550 A | 8/2000 | Jarrin et al. | 428/36.91 |
| 6,123,114 A | 9/2000 | Seguin et al. | 138/124 |
| 6,145,546 A | 11/2000 | Hardy et al. | 138/136 |
| 6,192,941 B1 | 2/2001 | Mallen-Herrero et al. | 138/135 |
| 6,235,793 B1 | 5/2001 | Bernat et al. | 514/652 |
| 6,283,161 B1 | 9/2001 | Feret et al. | 138/134 |
| 6,354,333 B1 | 3/2002 | Dupoiron et al. | 138/135 |
| 6,408,891 B1 | 6/2002 | Jung et al. | 138/127 |

(Continued)

FOREIGN PATENT DOCUMENTS

WO    WO 00/36324    6/2000

(Continued)

*Primary Examiner* — Patrick F Brinson
(74) *Attorney, Agent, or Firm* — Pearne & Gordon LLP

(57) ABSTRACT

The invention relates to a flexible pipe for transportation of fluids and gasses, e.g. useful in water transportation, and in offshore transportation of crude oil e.g. from seabed to an installation or between installations. The flexible pipe of the invention comprises a new type of armouring layers which is made from a combination of one or more profiled wires and one or more metal strips. A folded strip is an endless unit with at least one fold and a width which in unfolded condition is at least 6 times its thickness, such as at least 10, such as at least 15, such as at least 25 times its thickness or even up to 100 or 500 times its thickness. A profile is a preshaped non-folded cross sectional profile. The profile may preferably have a width of less than 6 times its thickness. The term 'endless' is used to indicate that the tapes and profiles are very long compared to their other dimensions.

44 Claims, 5 Drawing Sheets

U.S. PATENT DOCUMENTS

| | | | |
|---|---|---|---|
| 6,415,825 B1 | 7/2002 | Dupoiron et al. | 138/127 |
| 6,454,897 B1 | 9/2002 | Morand | 156/244.13 |
| 6,668,867 B2 | 12/2003 | Espinasse et al. | 138/135 |
| 6,691,743 B2 | 2/2004 | Espinasse | 138/134 |
| 6,840,286 B2 | 1/2005 | Espinasse et al. | 138/135 |
| 7,024,941 B2 | 4/2006 | Andersen | 73/775 |
| 7,311,123 B2 * | 12/2007 | Espinasse et al. | 138/135 |
| 2004/0055550 A1 | 3/2004 | Smith | 123/90.17 |
| 2004/0168521 A1 | 9/2004 | Andersen | 73/807 |
| 2006/0151042 A1 | 7/2006 | Stringfellow et al. | 138/125 |

FOREIGN PATENT DOCUMENTS

| | | |
|---|---|---|
| WO | WO 01/61232 | 8/2001 |
| WO | WO 01/81809 | 11/2001 |
| WO | WO 02/02309 | 1/2002 |
| WO | WO 02/42674 | 5/2002 |

\* cited by examiner

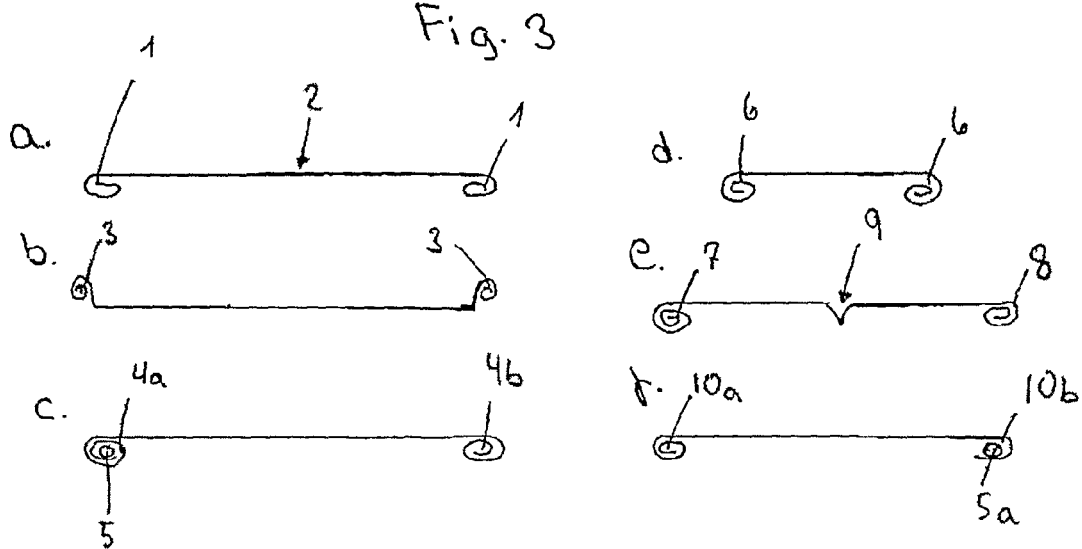
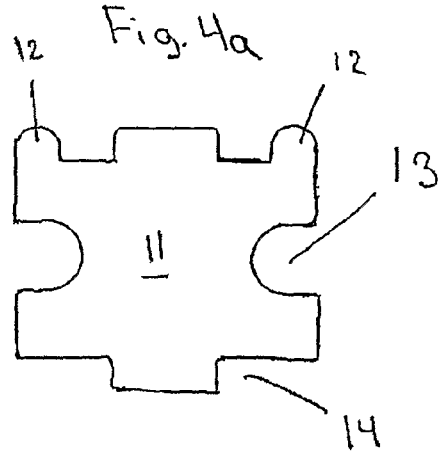

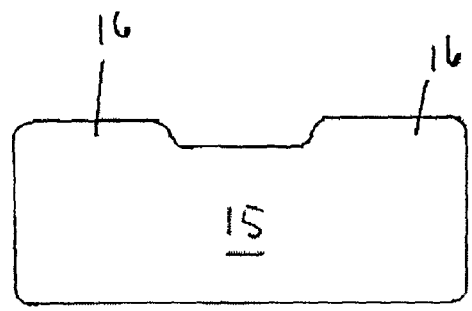
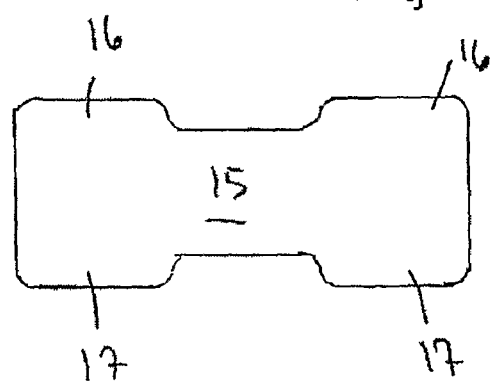
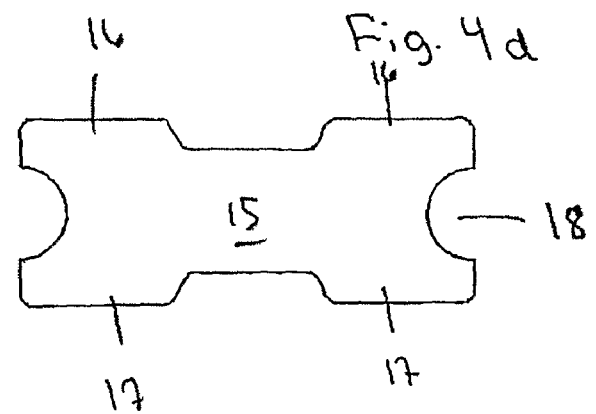

FLEXIBLE PIPE

This application is a National Stage Application of PCT/DK2007/050187, filed 17 Dec. 2007, which claims benefit of Serial No. PA 2006 01706, filed 22 Dec. 2006 in Denmark and which applications are incorporated herein by reference. To the extent appropriate, a claim of priority is made to each of the above disclosed applications.

TECHNICAL FIELD

The invention relates to a flexible pipe which can be used for transportation of fluids and gasses, and in particular a flexible pipe of the type which is useful in water transportation, and in offshore transportation of crude oil e.g. from seabed to an installation or between installations.

BACKGROUND ART

The flexible pipes for offshore use are often unbonded pipes. The term "unbonded" means in this text that at least two of the layers of the pipe are not bonded to each other. Often unbonded flexible pipes comprise an internal sheath which forms a barrier against the outflow of the fluid which is conveyed through the pipe, and one or more armouring layers on the outer side of the internal sheath (outer armouring layer(s)). The flexible pipe may comprise additional layers such as a carcass which is an inner armouring layer to prevent the collapse of the internal sheath. An outer sheath may be provided with the object of forming a barrier against the ingress of fluids from the pipe surroundings to the armouring layers. In practice the pipe will normally comprise at least two armouring layers, which are not bonded to each other directly or indirectly via other layers along the pipe. Thereby the pipe becomes bendable and sufficiently flexible to roll up for transportation.

Typical unbonded flexible pipes are e.g. disclosed in WO0161232A1, U.S. Pat. No. 6,123,114 and U.S. Pat. No. 6,085,799.

The above-mentioned type of flexible pipes is used, among other things, for off-shore as well as some on-shore applications for the transport of fluids and gases. Flexible pipes can e.g. be used for the transportation of fluids where very high or varying water pressure exists along the longitudinal axis of the pipe, such as riser pipes which extend from the seabed up to an installation on or near the surface of the sea, pipes for transportation of liquid and gases between installations, pipes which are located at great depths on the seabed, or between installations near the surface of the sea.

In traditional flexible pipes, the one or more armouring layers are most often in the form of helically wound steel wires e.g. shaped as profiles, where the individual layers may be wound at different winding angle relative to the pipe axis. Inner armouring layers are often made from folded interlocked steel strips, e.g $\infty$ folded strips, such as disclosed in U.S. Pat. No. 6,415,825.

In order to avoid formation of undesired gabs between the helically wound wires of the armouring layer, and in particular armouring layer adjacent to a internal sheath, the armouring layer are formed from interlocked profiled wires. A number of prior art documents disclosing such armouring layers formed from interlocked profiled wires. U.S. Pat. No. 6,065,501 discloses an armouring layer formed from interlocked T profiled wires or formed from alternating T and U profiled wires interlocked into each other. U.S. Pat. No. 6,415,825 discloses an armouring layer formed from interlocked Z profiled wires. U.S. Pat. No. 6,354,333 discloses I or H profiled wires interlocked a U profiled wires. U.S. Pat. No. 6,235,793 disclosed an armouring layer formed from X profiled wirers interlocked by a U profiled wires.

The object of the invention is provide a flexible pipe with an alternative armouring layer, which is simple to produce and has the necessary strength for use as armouring layers, such as pressure armouring layer and carcass.

This object has been achieved by the invention as claimed.

DISCLOSURE OF INVENTION

It should be emphasized that the term "comprises/comprising" when used in this specification is taken to specify the presence of stated features, integers, steps or components but does not preclude the presence or addition of one or more other stated features, integers, steps, components or groups thereof.

The inventor of the present invention has thus created a new type of armouring layers which is made from a combination of one or more profiled wires and one or more metal strips. A folded strip is herein defined as an in principle endless unit with at least one fold and a width which in unfolded condition is at least 6 times its thickness, such as at least 10, such as at least 15, such as at least 25 times its thickness or even up to 100 or 500 times its thickness. A profile is an in principle endless unit with a preshaped non-folded cross sectional profile. The profile may preferably have a width of less than 6 times its thickness. The term 'endless' is used to indicate that the tapes and profiles are very long compared to their other dimension.

The flexible pipe of the invention comprises a plurality of layers surrounding a hollow core the plurality of layers comprises an internal sheath and one or more armouring layers, at least one interlocked armouring layer being formed from at least one profiled wire and at least one folded metal strip, and this at least one profiled wire and this at least one folded metal strip are helically wound and interlocked with each other.

The interlocked armouring layer formed from at least one profiled wire and at least one folded metal strip can thus be provided with a desired thickness and yet maintain a desired flexibility. Simultaneously by providing the interlocked armouring layer from at least one profiled wire and at least one folded metal strip formation of undesired gabs can be avoided. The thickness of the interlocked armouring layer is mainly provided by the profiled wire whereas the flexibility is provided mainly by the folded metal strip. By this construction it has also been found that the same folded strip can be used for interlocking profiled wires of different thickness. This means that different interlocked armouring layers of different thickness may be produced from one type of folded strips together with different types of profiled wires, wherein the profiled wires are of different thickness.

As it will be clear from the following description various embodiments of the invention provides additional benefits.

As mentioned above the flexible pipe of the invention may have one or more armouring layer. The number and the placement of armouring layer or layers may e.g. be as it is well known from prior art e.g. as disclosed in U.S. Pat. No. 6,065,501, U.S. Pat. No. 5,813,439 and WO 01/81809. At least one of the armouring layers in an interlocked armouring layer formed from at least one profiled wire and at least one folded metal strip.

The flexible pipe of the invention may in one embodiment comprise two or more armouring layers wound onto the internal sheath. The two armouring layers may e.g. be of wound wires, e.g. cross wound at angles to the centre axis of the pipe of 40-60 degrees, such as 45-58 degrees, such as 53-56 degrees to the centre axis of the pipeline. Such armouring layers of cross wound wires having angles of 40-60 degrees are often referred to as a pair of balanced traction layers. The flexible pipe may additionally comprise an inner armouring layer which in general is referred to as a carcass.

Any degrees mentioned herein should be taken to mean degrees in relation to the centre axis of the pipe unless other is specified.

An inner armouring layer is an armouring layer which is placed inside the internal sheath and has the main purpose of preventing crushing of the pipe due to external forces. An inner armouring layer may be placed in direct contact with the inner side of the internal sheath or one or more material layers e.g. a film and/or an insulating layer may be placed between the inner side of the internal sheath and the inner armouring layer.

An outer armouring layer is an outer armouring layer placed outside the internal sheath and has the main purpose of resisting pressure forces due to internal forces and/or resisting traction forces due to both external and external forces. Typically a flexible pipe will comprise at least two outer armouring layers. An innermost outer armouring layer may be placed in direct contact with the outer side of the internal sheath or one or more material layers e.g. a film may be placed between the outer side of the internal sheath and the innermost outer armouring layer. If the pipe comprises two or more outer armouring layers, these outer armouring layers may be placed in direct contact with each other or the two or more outer armouring layers may independently of each other be separated by one or more material layers e.g. film layer(s), intermediate sheath(s), insulation sheath(s) or similar.

For protection the flexible pipe may comprise an outer sheath, preferably of a polymer layer.

The flexible pipe of the invention may in one embodiment comprise an inner armouring layer and three or more outer armouring layers, wherein the innermost of the outer armouring layers is a vault of wound wires, wound at a steep angle to the centre axis of the pipe, e.g. above 80 degree, such as above 90 degree, and the other two armouring layers are of wound wires, cross wound at angles of 25-40, and 70-80 degrees, respectively.

The flexible pipe of the invention may comprise additional layers such as it is well known in the art, e.g. insulation layers of polymers, composite, cork or other, intermediate polymer sheaths or films and etc.

The flexible pipe of the invention may for example have a structure as described in any one of the prior art documents U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550, with the difference that at least one of the armouring layers is an interlocked armouring layer formed from at least one profiled wire and at least one folded metal strip, preferably as described herein.

In one embodiment one of the armouring layers is an interlocked armouring layer formed from at least one profiled wire and at least one folded metal strip, preferably as described herein. This could preferably an inner armouring layer or it could be an innermost outer armouring layer, e.g. a vault.

In one embodiment two or more of the armouring layers are interlocked armouring layers each formed from at least one profiled wire and at least one folded metal strip, preferably as described herein. This could preferably include an inner armouring layer and/or an innermost outer armouring layer, e.g. a vault.

In the following the term 'profiled wire' should mean 'at least one profiled wire' unless otherwise specified, and similarly the term 'folded metal strip' should mean 'at least one folded metal strip' unless otherwise specified.

In one embodiment the profiled wire comprising a base with at least two lateral flanges each, independently of each other, protrudes in one of the directions towards or away from the hollow core, said at least one folded metal strip being folded to form two edge sections, wherein the profiled wire in one winding is locked to said profiled wire in a subsequent winding by said folded metal strip.

A lateral flange means a flange extending essentially in the length direction of the profile. The flange may be a continuous or a discontinuous flange. In practice it is most simple to provide the profile with continuous flange(s).

The base of the profile is the part that connects the two lateral flanges. The base may in principle have any shape. The base may in one embodiment be essentially flat or be slightly curved e.g. in a convex or concave fashion.

The directions towards or away from the hollow core should be taken to mean the radial directions toward the centre axis of the pipe.

The edge sections of the folded metal strip should be taken to mean the two opposite edge sections extending essentially in the length direction of the strip and comprising at least one fold capable of engage with a flange of the profile.

The flexible pipe may in principle comprise any number of helically wound folded metal strips $N_s$ and any number of helically wound profiled wires $N_w$.

In one embodiment the number of helically wound folded metal strips $N_s$ is at least the number $N_w$ of helically wound profiled wires. The number of helically wound profiled wires $N_w$ may preferably be $=Y*$the number of helically wound folded metal strips $N_s$, wherein Y is an integer of 1 or 2.

In a preferred embodiment the number of helically wound profiled wires $N_w$ is 1-100, such as any number there between.

In pressure armouring layers the number of helically wound profiled wires $N_w$ is usually relatively low, such as 10 or less, e.g. 1-5. Pressure armouring layers comprises the group of armouring layers selected from inner armouring layers and outer armouring layers mainly provided to resist pressure forces. Outer armouring layers mainly provided to resist pressure forces does normally include armouring layers of wires with a winding angle of 80 degrees or more.

In traction armouring layers the number of helically wound profiled wires $N_w$ is usually more than one, such as more than 5, such as 10 to 100. Traction armouring layers comprises the group of armouring layers mainly provided to resist pressure forces preferably selected from outer armouring layers of wires with a winding angle of less than 80 degrees.

In one embodiment the helically wound folded metal strips and said helically wound profiled wires are wound with essentially the same winding angle to the centre axis of the flexible pipe. The winding angle may be as disclosed above e.g. the winding angle is 25-90, such as 80-90 degrees for pressure armouring layers and such as 25-80 degrees for traction armouring layers.

The edge sections the folded metal strip may preferably be arranged to interlock with lateral flanges of the profiled wire.

In one embodiment wherein the profiled wire comprises a base with at least two lateral flanges protruding in one of the directions towards or away from the hollow core, the folded metal strip is folded to form two edge sections protruding in the other one of the directions towards or away from the hollow core.

The profiled wire may in principle have any profiled shape. Preferred shapes of the profiled wire includes the shape of the profiled wires as disclosed in any one of the publications U.S. Pat. No. 6,691,743, U.S. Pat. No. 6,668,867, U.S. Pat. No. 5,813,439, WO 0242674, U.S. Pat. No. 5,730,188, U.S. Pat. No. 6,354,333, U.S. Pat. No. 4,549,581, U.S. Pat. No. 6,192,941, U.S. Pat. No. 6,283,161, WO 0181809, WO 0036324, U.S. Pat. No. 6,454,897, U.S. Pat. No. 6,408,891 and U.S. Pat. No. 6,110,550. More preferably the profiled wire(s) has/have a profile selected from the group consisting of Z-shaped profiles, U-shaped profiles, X-shaped profiles, I-shaped profiles, H-shaped profiles and T-shaped profiles.

In one embodiment the profiled wire has a T-shaped profile. The at least one profiled T-shaped wire preferably comprises a base with two lateral flanges protruding in one of the directions towards or away from the hollow core, and a protruding flange extending from the base between the two lateral flanges and in the same direction towards or away from the hollow core as said two lateral flanges. In this embodiment one folded metal strip can engage with one of the lateral flanges of the profile while simultaneously being physically separated from a folded metal strip engaged with the other one of the lateral flanges of the profile by said protruding flange extending from the base between the two lateral flanges. The protruding flange extending from the base between the two lateral flanges thereby constitutes a fence between the two folded metal strips engaged with the profiled wire.

During transport and use a flexible pipe will be bended in a more or less controlled fashion. The engagements between the profiled wire and the folded metal strip may consequently slide from side to side within a predetermined play. This play should preferably be arranged to provide a sufficient play for good flexibility and still be sufficiently limited to provide strength and stability to the pipe. By physically separating adjacent folded metal strip engaging the same profiled wire, the desired play can be obtained while simultaneously obtaining a high degree of stability and strength.

In one embodiment the profiled wire has a Z-shaped profile. The at least one profiled wire comprises a base with two lateral flanges, a first flange protruding in the direction towards the hollow core, and a second flange protruding in the direction away from the hollow. In this embodiment one folded metal strip can engage with one of the lateral flanges of the profile while simultaneously being physically separated from a folded metal strip engaged with the other one of the lateral flanges of the profile by said base between the two lateral flanges. The base thereby constitutes a fence between the two folded metal strips engaged with the profiled wire.

In one embodiment the profiled wire has an X-shaped profile. The profiled wire comprises a base with two lateral flanges protruding in one of the directions towards or away from the hollow core, and two lateral flanges protruding in the other one of the directions towards or away from the hollow core. The folded metal strip is folded to form two edge sections protruding in at least one of the directions towards or away from the hollow core. In this embodiment the interlocked wire may preferably comprise 2 folded metal strips for each profiled wire, where half of the folded metal strips comprises edge sections protruding in one of the directions towards or away from the hollow core, and the other half of the folded metal strips comprises edge sections protruding in the other one of the directions towards or away from the hollow core. In this embodiment each profiled wire can thus be engaged by 4 folded metal strips, two on the side of the profiled wire turned towards the hollow core and two on the side of the profiled wire turned away from the hollow core. This embodiment thus provides a very stable and strong armouring layer, while simultaneously maintaining a very high flexibility.

The x-shaped profiled wire may thus preferably in one winding be locked to said at least one profiled wire in a subsequent winding by at least one folded metal strip comprising edge sections protruding in one of the directions towards or away from the hollow core, and one folded metal strips comprising edge sections protruding in the other one of the directions towards or away from the hollow core.

The folded metal strip may in principle be folded to form the edge sections with any shape, provided that they can engage with the lateral flange of the profiled wire. In one embodiment the folded metal strip is folded against it self at least along one of its edges to form at least one edge section protruding in one of the directions towards or away from the hollow core.

In one embodiment the folded metal strip is folded along both of its edges to form the edge sections protruding in one of the directions towards or away from the hollow core.

The folding direction and the protruding direction may be essentially the same or they may be essentially opposite each other. The folding direction means the direction perpendicular to the surface of the non-folded part of the edge section of the folded metal strip and towards the folded part of the edge section.

In most situations it is desired that the folding direction and the protruding direction are essentially the same.

The folded metal strip should preferably be folded at least along one of its edges in at least one fold to form at least one edge section.

'One fold' means that the edge part is folded one time to form a two layered edge section.

In one embodiment the folded metal strip is folded at least along one of its edges in at least two folds to form at least one edge section having 3 or more layers.

The folded metal strip may in one embodiment be folded against it self in at least along one of its edges in at least one fold, such as two or even more folds to form at least one edge section, where the edge section comprises two or more layers of strip material.

In one embodiment the folded metal strip is folded at least along one of its edges so that a secondary element is integrated into the folding. The secondary material may in principle be any kind of material, such as an reinforcement thread or film. In one embodiment the secondary element integrated into the folding is a fiber such a fiber sensor, e.g. for sensing stress, and or temperature or properties of the pipe or pipe elements. A suitable sensor is the sensor as described in U.S. Pat. No. 7,024,941.

The folded metal strip may preferably be folded to form two edge sections and a non-folded mid-section between the two edge sections.

The non-folded mid-section may in principle have any shape and thickness within the limitation for a strip. However, in general it is preferred that the non-folded mid-section is essentially flat in order to allow the desired play between engaged profiled wires and folded metal strips.

In one embodiment the non-folded mid-section has an essentially uniform thickness.

The optimal thickness of the folded metal strip depends largely on the size of pipe, the pretended use of the pipe and the strength of the metal used for the folded metal strip. It the pipe is large the thickness of the folded metal strip should preferably be relatively large as well, e.g. even up to 16 mm.

If the pipe is to be used as a riser the thickness of the folded metal strip may preferably be larger than if the pipe is to be used as a flow line.

In most situations a thickness of the folded metal strip of about 5 mm or even about 2 mm is sufficient.

In one embodiment the non-folded mid-section has a non-folded thickness $T_{ns}$ of 0.2-5 mm, such as 0.2-2 mm.

The folded layers of the edge section of the folded metal strip may e.g. have a thickness which is different from the non-folded mid-section. Thus in one embodiment the folded layers of the edge section of the folded metal strip has a thickness of between 0.5 and 1.5 times the thickness of the non-folded mid-section. In principle the edge sections may thus each has an edge sections thickness $T_{fs}$ of down to one time the thickness of the non-folded mid-section $T_{ns}$. However in practice it is desired that the edge sections is thicker than the non-folded mid-section $T_{ns}$.

In one embodiment the edge sections each has an edge sections thickness $T_{fs}$ of 1.5 to 10 times the thickness of the non-folded mid-section $T_{ns}$, such as of 3-4 times the thickness of the non-folded mid-section $T_{ns}$.

The profiled wire comprises a base with a first and a second face placed respectively away from and towards the hollow core.

In one embodiment the profiled wire comprises two lateral flanges protruding from the first face of the base to thereby forming at least one first face channel. One edge section of one folded metal strip may preferably protrudes into said at least one first channel and engages with one of the two lateral flanges, and one other edge section of one folded metal strip protrudes into said at least one channel and engages with the other one of the two lateral flanges.

In one embodiment the profiled wire further comprises two lateral flanges protruding from the second face of the base to thereby forming at least one second face channel. One edge section of one folded metal strip may preferably protrudes into said at least one second channel and engages with one of the two lateral flanges, and one other edge section of one folded metal strip protrudes into said at least one channel and engages with the other one of the two lateral flanges.

The profiled wire may therefore comprise at least one first channel on a first side of the base and at least one second channel on the second side of the base.

In one embodiment the profiled wire may comprise two or more first face channels and/or two or more second face channels. The two or more first face channels and/or two or more second face channels may e.g. be separated by a fence, e.g. in the form of a flange protruding from the respective sides of the base. Preferably an edge section of one folded metal strip protrudes into each of said two first face channels and/or two second face channels.

The fence may preferably have a height which is up to the height of the thickness of the edge sections of the folded strip(s). Thereby a very good engagement between the profiled wire and the folded metal strip can be obtained.

The profiled wire has a base thickness $T_{bw}$, which is defined by the distance between the first and the second face. If the actual thickness is varying over the base, the thickness to of the base should mean the average thickness. It is in most situations desired that the base thickness $T_{bw}$ is equal to or higher than the non-folded thickness $T_{ns}$ of the at least one folded metal strip to which it is engaged. Preferably the base thickness $T_{bw}$ is at least 2 times, such as at least 5 times, such as 6-40 times higher than the non-folded thickness $T_{ns}$ of the folded metal strip to which it is engaged.

In one embodiment the profiled wire has a base thickness $T_{bw}$ of 2 to 25 mm, such as 3 to 20 mm, such as 5 to 15 mm.

The protruding flanges of the profiled wire each has a flange height, which is defined by the protruding distance from the base. The flange height may preferably be equal to or less than the edge sections thickness $T_{fs}$. In a preferred embodiment the flange height being about the edge sections thickness $T_{fs}$ minus the non-folded thickness $T_{ns}$. Thereby a particular good engagement between the profiled wire and the folded metal strip can be obtained.

The edges of the profiled wire may have any shape. Preferably edges of the profiled wire or wires in consecutive turn of the profile wounded to form the armouring layer are adapted to each other. The edges of the profiled wire may e.g. be essentially plan. In one embodiment the edges of the profiled wire comprise a groove and/or a concavity. A secondary element e.g. a wire and/or a sensor may be placed in such groove/concavity.

The folded metal strip may in principle be made from any metal which can be folded and which has a sufficient strength to hold together profiled wire by engagement as described above. Preferably the folded metal strip is made from a relatively high nobility. Preferred metals for the folded metal strip include steel and steel alloys, e.g. a duplex steel.

The profiled wire may in principle be of any material which has the sufficient strength for providing the armouring layer. The material for the profiled wire may e.g. be selected from the group consisting of composite materials and metals. In one embodiment the profiled wire f metal, such as steel or a steel alloy, e.g. a duplex steel.

In order to minimize the risk of galvanic corrosion of the folded metal strip in situation where the profiled wire is of metal, the folded metal strip should preferably be of the same metal or the folded metal strip may be of a metal with a higher nobility than the one profiled wire. In the latter situation the profiled wire can be made from a less expensive material.

BRIEF DESCRIPTION OF DRAWINGS

The invention will be explained more fully below in connection with a preferred embodiment and with reference to the drawings in which:

FIG. 3a-3f are schematic cross sectional side views of a different folded metal strip, which can be a part of an armouring layer of the flexible pipe of the invention.

FIG. 4a-4g are schematic cross sectional side views of different profiled wires, which can be a part of an armouring layer of the flexible pipe of the invention.

The figures are schematic and simplified for clarity, and they just show details which are essential to the understanding of the invention, while other details are left out. Throughout, the same reference numerals are used for identical or corresponding parts.

Figure 1:
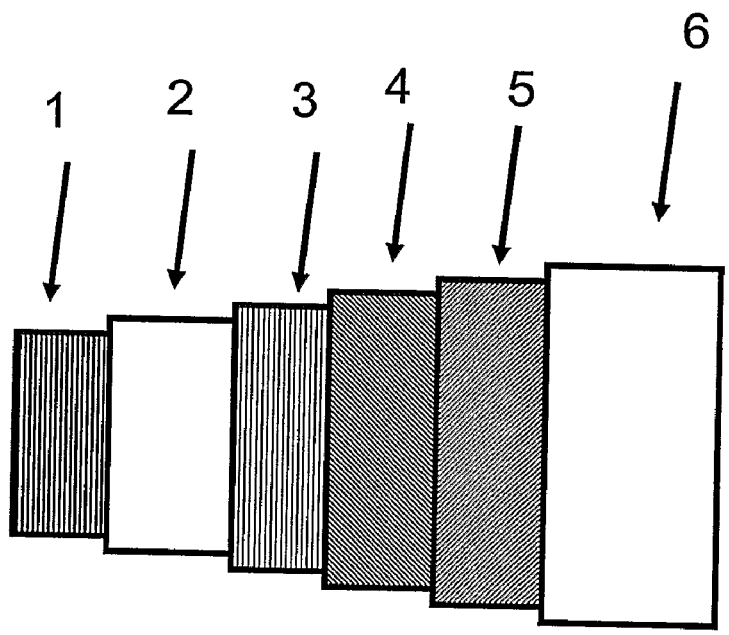
FIG. 1 is a schematic side view of a pipe with a carcass.

The flexible pipe shown in FIG. 1 comprises an internal sheath 2, often also called an inner liner, e.g. of cross linked PE. Inside the inner liner 2 the pipe comprises an inner armouring layer 1, called a carcass. On the outer side of the inner liner 2, the flexible pipe comprises three outer armouring layers 3, 4, 5. The inner armouring layer 3 closest to the inner liner 2, is a pressure armouring layer 3, made from wires and/or strips wound at a steep angle to the centre axis of the pipe, e.g. close to 90 degrees. Around the pressure armouring layer 3, the pipe comprises a pair of cross wound tensile armouring layers 4, 5, made from wound wires and/or strips, wherein one of the tensile armouring layers 4 has an angle above 55 degree, typically between 60 and 75 degrees, and wherein the other one of the tensile armouring layers 5 has an angle below 55 degree, typically between 30 and 45 degrees. The piper further comprises an outer polymer layer 6 protecting the armouring layer mechanically and/or against ingress of sea water.

At least one of the armouring layers 2, 3, 4, 5 is formed from at least one profiled wire and at least one folded metal strip as described above.

Figure 2:
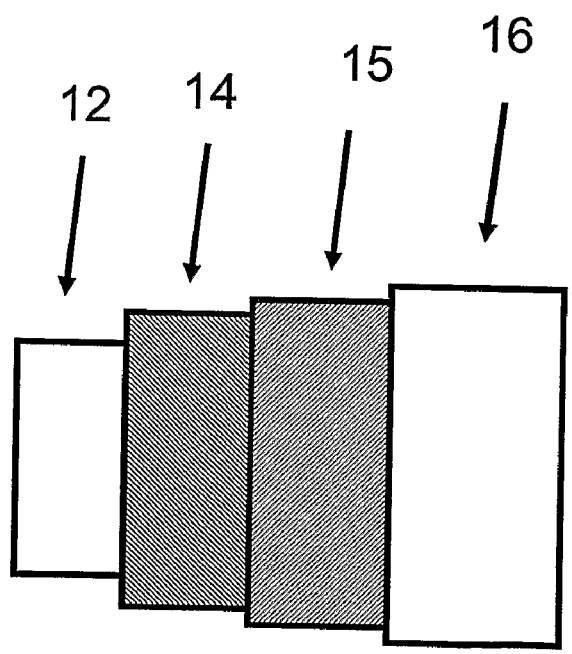
FIG. 2 is a schematic side view of a pipe without a carcass.

FIG. 2 shows another pipe design. This flexible pipe comprises an inner liner 12 and a pair of outer armouring layers, 14, 15, in the form of wires and/or strips wound around the inner liner 12. The two armour layers are cross wound at an angle to the centre axis of the pipe of close to 55 degree, typically one of the layers is wound at an angle slightly less than 55 degrees, e.g. between 52 and 55 degrees and the other of them is wound at an angle slightly more than 55 degrees e.g. between 55 and 57. The piper further comprises an outer polymer layer 16 protecting the armouring layer mechanically and/or against ingress of sea water.

At least one of the armouring layers 14,15 is formed from at least one profiled wire and at least one folded metal strip as described above.

FIG. 3a shows a cross sectional side view of a folded metal strip useful in an armouring layer of the pipe of the invention. The metal strip is folded to form two edge sections 1, both protruding in the same direction, namely in the folding direction. The metal strip being folded against it self along its edges in two folds for each of the edge sections 1. The strip further comprises a non-folded mid-section 2, between the two edge sections 1.

FIG. 3b shows a cross sectional side view of another folded metal strip. The metal strip is folded to form two edge sections 3, both protruding in the opposite direction of the folding direction.

FIG. 3c shows a cross sectional side view of another folded metal strip, where the metal strip is folded to form two edge sections 4a, 4b, both protruding in the same direction. The metal strip is folded against a secondary element 5, such as a fibre in its first edge section 4a. In its second edge section the strip is folded against it self in 3 folds. The number of folds may naturally be adjusted as desired.

The strip shown in FIG. 3d differs from the strip of FIG. 3a in the number of folds of the two edge sections 6.

FIG. 3e shows a cross sectional side view of another folded metal strip, where the metal strip is folded to form two edge sections 7, 8 with respectively 4 and 3 folds. Furthermore the mid-section 9 of the metal stripe is deformed to provide a protrusion adapted to protrude at least partly in between adjacent profiles to control sliding movements of the elements of the armouring layer.

FIG. 3f shows a cross sectional side view of another folded metal strip, where the metal strip is folded to form two edge sections 10a, 10b, both protruding in the same direction. The metal strip is folded against a secondary element 5a, such as a fibre in one of its edge section 10b. In the other one of its edge sections 10a the strip is folded against it self in 3 folds.

FIG. 4a shows a first profiled wire, useful for providing a part of an armouring layer of the flexible pipe of the invention. The profiled wire is a K profile such as it is described in WO 01/81809. The profiled wire comprises a base 11 and two lateral flanges 12 protruding in the same direction. The profiled wire further comprises recesses 13 in the sides of the base 11 and cut-outs 14 of the corners of the profiled wire opposite the lateral flanges 12.

FIG. 4b shows another profiled wire, useful for providing a part of an armouring layer of the flexible pipe of the invention. The profiled wire comprises a base 15 and two lateral flanges 16 protruding in the same direction.

FIG. 4c shows another profiled wire, which differs from the profiled wire shown in FIG. 4b in that it additionally comprises a further pair of lateral flanges 17 protruding in the opposite direction of the first two lateral flanges 16.

FIG. 4d shows another profiled wire, which differs from the profiled wire shown in FIG. 4c in that it additionally comprises recesses 18 in the sides of the base 15.

Figure 4E:
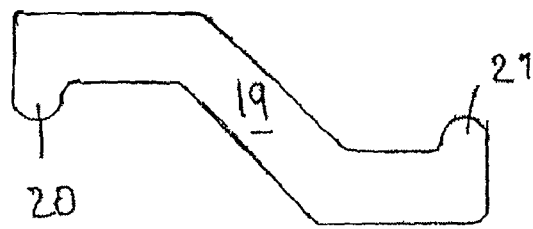

FIG. 4e shows another profiled wire shaped as a Z-profiled wire which seen in profile comprises a base 19 shaped as a Z and two lateral flanges 20, 21 protruding in directions opposite to each other.

Figure 4F:
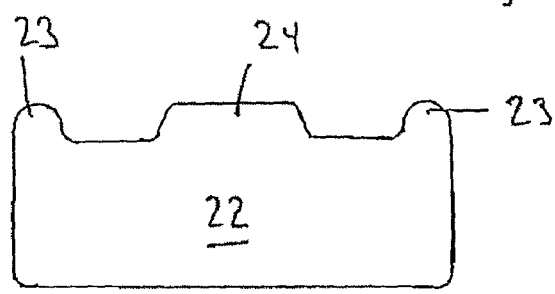

FIG. 4f shows another profiled wire, useful for providing a part of an armouring layer of the flexible pipe of the invention. The profiled wire comprises a base 22 and two lateral flanges 23 protruding in the same direction. Between the lateral flanges 23 the profiled wire comprises a protruding flange 24 extending from the base 22 in the same direction as the two lateral flanges 23. This profiled wire is normally described as a T shaped profiled wire.

Figure 4G:
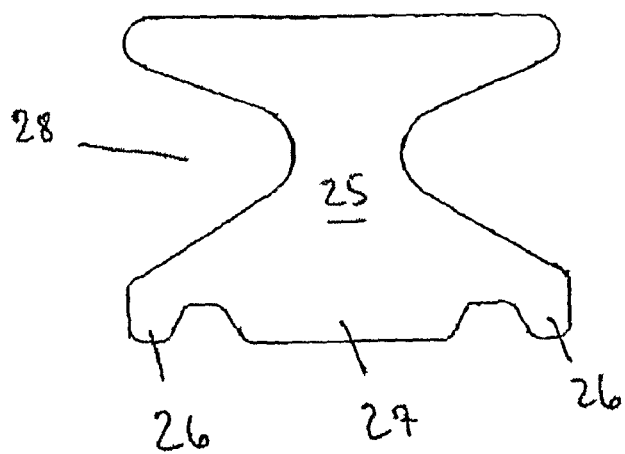

FIG. 4g shows a further profiled wire, useful for providing a part of an armouring layer of the flexible pipe of the invention. The profiled wire comprises a base 25 and two lateral flanges 26 protruding in the same direction. Between the lateral flanges 26 the profiled wire comprises a protruding flange 27 extending from the base 25 in the same direction as the two lateral flanges 26. The profiled wire further comprises recesses 28 in the sides of the base 25.

Figure 5:
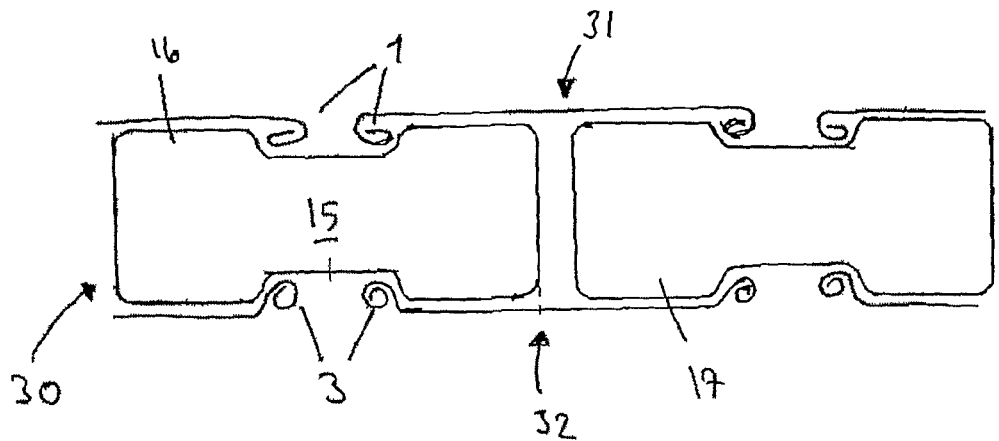
FIG. 5 is a cross sectional side view of an armouring layer made from interlocked folded strips and profiled wires.

FIG. 5 shows a cross-sectional cut of a part of an armouring layer of a flexible pipe of the invention. The armouring layer is formed from at least one profiled wire 30 and at least two folded metal strip 31, 32, said at least one profiled wire and said at least one folded metal strip being helically wound and interlocked with each other. The profiled wire(s) 30 is shaped as the profiled wire shown in FIG. 4c. The folded metal strips 31, 32 correspond respectively to the folded metal strips shown in FIG. 3a and FIG. 3b.

The lateral flanges 16 of the profiled wire(s) 30 being engaged with the edge sections 1 of the folded metal strip(s) 31, and the lateral flanges 17 of the profiled wire(s) 30 being engaged with the edge sections 3 of the folded metal strip(s) 32 to thereby interlock the profiled wire(s) 30 with the folded metal strips 31, 32.

Figure 6:
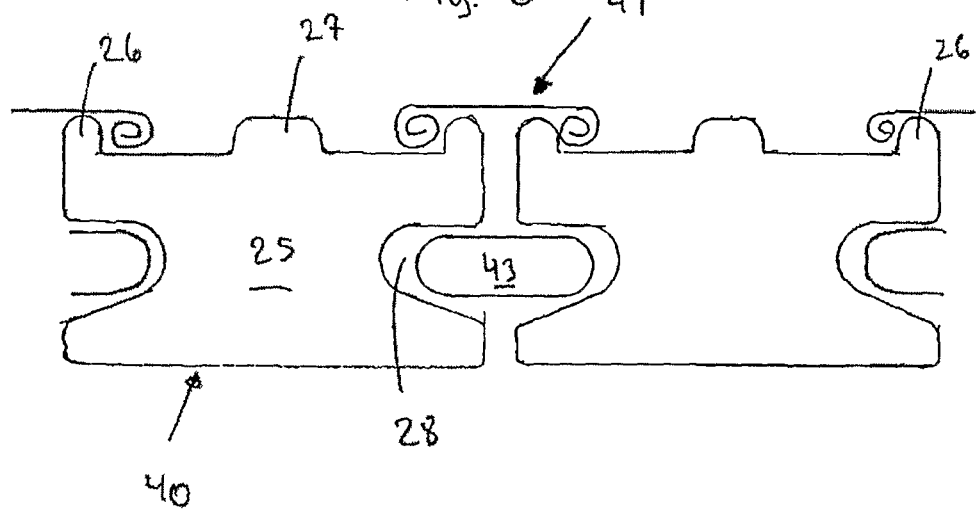
FIG. 6 is a cross sectional side view of another armouring layer made from interlocked folded strips and profiled wires.

FIG. 6 shows a cross-sectional cut of a part of another armouring layer of a flexible pipe of the invention. The armouring layer is formed from at least one profiled wire 40 and at least one folded metal strip 41 as well as at least one locking element 43. The locking element(s) 43 is as described in WO 01/81809 and is in the form of a wire with an oval profile.

The profiled wire(s) 40, the folded metal strip(s) 41 and the locking element(s) 43 are helically wound and the profiled wire(s) 40 and the folded metal strip(s) 41 are interlocked with each other. The profiled wire(s) 40 corresponds to the profiled wire shown in FIG. 4g. The folded metal strip(s) 41 corresponds to the folded metal strip shown in FIG. 3d.

The lateral flanges 26 of the profiled wire(s) 40 being engaged with the edge sections 6 of the folded metal strip(s) 41 to thereby interlock the profiled wire(s) 40 with the folded metal strip(s) 41. The locking element(s) 43 is arranged in the cavity formed by two adjoining recesses 8 of the profiled wire(s) 40 to thereby lock against uncontrolled, radial displacement of the profiled wire(s) 40 and the folded metal strip(s) 41.

Figure 7:
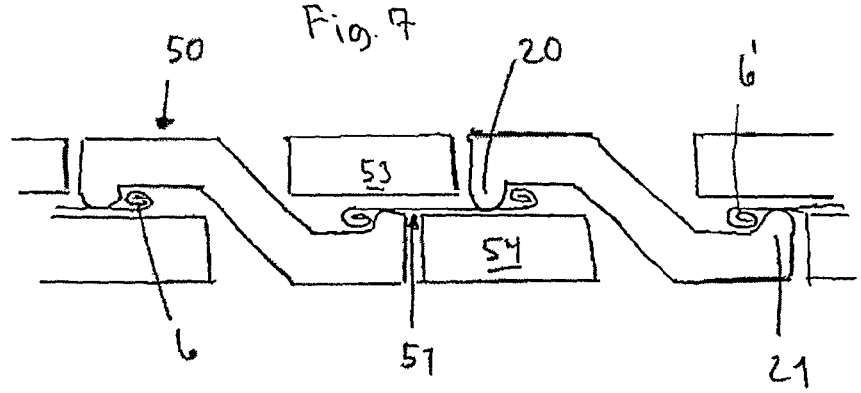
FIG. 7 is a cross sectional side view of yet another armouring layer made from interlocked folded strips and profiled wires.

FIG. 7 shows a cross-sectional cut of a part of another armouring layer of a flexible pipe of the invention. The armouring layer is formed from at least one profiled wire 50 and at least one folded metal strip 51 as well as at least two support wires 53, 54. The support wires 53, 54 are in the form of wires with an essentially rectangular profile.

The profiled wire(s) 50, the folded metal strip(s) 51 and the support wires 53, 54 are helically wound and the profiled wire(s) 50 and the folded metal strip(s) 51 are interlocked with each other. The profiled wire(s) 50 corresponds to the profiled wire shown in FIG. 4e. The folded metal strip(s) 51 corresponds to the folded metal strip shown in FIG. 3d with the difference that the edge sections 6, 6' of the folded metal strip(s) protrudes in opposite directions.

The lateral flanges 20, 21 of the profiled wire(s) 50 being engaged with the edge sections 6, 6' of the folded metal strip(s) 51 to thereby interlock the profiled wire(s) 50 with the folded metal strip(s) 51. The support wires 53, 54 are arranged in cavities formed between the windings of the profiled wire(s) 50 to thereby lock against uncontrolled, radial displacement of the profiled wire(s) 50 and the folded metal strip(s) 51.

Some preferred embodiments have been shown in the foregoing, but it should be stressed that the invention is not limited to these, but may be embodied in other ways and variations as it will be clear for the skilled person.

The invention claimed is:

1. A flexible pipe comprising a plurality of layers surrounding a hollow core the plurality of layers comprises an internal sheath and one or more armouring layers, at least one interlocked armouring layer comprises at least one profiled wire and at least one folded metal strip, said at least one profiled wire and said at least one folded metal strip being helically wound and interlocked with each other.

2. The flexible pipe as claimed in claim 1 wherein said at least one profiled wire comprising a base with at least two lateral flanges each, independently of each other, protrudes in one of the directions towards or away from the hollow core, said at least one folded metal strip being folded to form two edge sections, wherein said at least one profiled wire in one winding is locked to said at least one profiled wire in a subsequent winding by said at least one folded metal strip.

3. The flexible pipe as claimed in claim 1 wherein the number of helically wound folded metal strips $N_s$ being at least the number $N_w$ of helically wound profiled wires.

4. The flexible pipe as claimed in claim 1 wherein said helically wound folded metal strips and said helically wound profiled wires being wound with essentially the same winding angle to the centre axis of the flexible pipe.

5. The flexible pipe as claimed in claim 1, the at least one folded metal strip being folded to form two edge sections, wherein the edge sections of said at least one folded metal strip being engaged with lateral flanges of said at least one profiled wire.

6. The flexible pipe as claimed in claim 1, wherein said at least one profiled wire comprising a base with at least two lateral flanges protruding in one of the directions towards or away from the hollow core, said at least one folded metal strip being folded to form two edge sections protruding in the other one of the directions towards or away from the hollow core.

7. The flexible pipe as claimed in claim 1, wherein said at least one profiled wire has a profile selected from Z-shaped profiles, U-shaped profiles, X-shaped profiles, I-shaped profiles, H-shaped profiles or T-shaped profiles.

8. The flexible pipe as claimed in claim 7, wherein said at least one profiled wire has a T-shaped profile said at least one profiled wire comprising a base with two lateral flanges protruding in one of the directions towards or away from the hollow core, and a protruding flange extending from said base between the two lateral flanges and in the same direction towards or away from the hollow core as said two lateral flanges.

9. A flexible pipe as claimed in claim 7, wherein said at least one profiled wire has a Z-shaped profile said at least one profiled wire comprising a base with two lateral flanges, a first flange protruding in the direction towards the hollow core, and a second flange protruding in the direction away from the hollow.

10. The flexible pipe as claimed in claim 7, wherein said at least one profiled wire has an X-shaped profile said at least one profiled wire comprising a base with two lateral flanges protruding in one of the directions towards or away from the hollow core, and two lateral flanges protruding in the other one of the directions towards or away from the hollow core, said at least one folded metal strip being folded to form two edge sections protruding in at least one of the directions towards or away from the hollow core.

11. The flexible pipe as claimed in claim 10, wherein said interlocked wire comprises 2 folded metal strips for each profiled wire, half of the folded metal strips comprises edge sections protruding in one of the directions towards or away from the hollow core, and the other half of the folded metal strips comprises edge sections protruding in the other one of the directions towards or away from the hollow core.

12. The flexible pipe as claimed in claim 11, wherein said at least one profiled wire in one winding is locked to said at least one profiled wire in a subsequent winding by at least one folded metal strip comprising edge sections protruding in one of the directions towards or away from the hollow core, and one folded metal strips comprising edge sections protruding in the other one of the directions towards or away from the hollow core.

13. A flexible pipe comprising a plurality of layers surrounding a hollow core the plurality of layers comprises an internal sheath and one or more armouring layers, at least one interlocked armouring layer comprises at least one profiled wire and at least one folded metal strip, said at least one profiled wire and said at least one folded metal strip being helically wound and interlocked with each other, wherein the at least one folded metal strip being folded against it self at least along one of its edges to form at least one edge section protruding in one of the directions towards or away from the hollow core.

14. The flexible pipe as claimed in claim 13, wherein the at least one folded metal strip being folded along both of its edges to form the edge sections protruding in one of the directions towards or away from the hollow core.

15. The flexible pipe as claimed in claim 13, wherein the at least one folded metal strip being folded at least along one of its edges in a folding direction.

16. The flexible pipe as claimed in claim 13, wherein the at least one folded metal strip being folded at least along one of its edges in at least one fold to form at least one edge section.

17. The flexible pipe as claimed in claim 16, wherein the at least one folded metal strip being folded at least along one of its edges in at least two folds to form at least one edge section.

18. The flexible pipe as claimed in claim 13, wherein the at least one folded metal strip being folded against it self in at least along one of its edges in at least one fold to form at least one edge section.

19. The flexible pipe as claimed in claim 13, wherein the at least one folded metal strip being folded against it self to form at least one edge section comprising two or more layers of strip material.

20. The flexible pipe as claimed in claim 13, wherein the at least one folded metal strip being folded at least along one of its edges so that a secondary element is integrated into the folding.

21. The flexible pipe as claimed in claim 1, wherein said at least one folded metal strip being folded to form two edge sections and a non-folded mid-section between the two edge sections.

22. The flexible pipe as claimed in claim 21, wherein said non-folded mid-section has an essentially uniform thickness.

23. The flexible pipe as claimed in claim 21, wherein said non-folded mid-section has a non-folded thickness $T_{ns}$ of 0.2-5 mm.

24. The flexible pipe as claimed in claim 16, wherein said edge sections each has an edge sections thickness $T_{fs}$ of 1.5 to 10 times $T_{ns}$.

25. The flexible pipe as claimed in claim 1, wherein said at least one profiled wire comprising a base with a first and a second face placed respectively away from and towards the hollow core.

26. The flexible pipe as claimed in claim 25, wherein said two lateral flanges protrudes from the first face of the base to thereby forming at least one first face channel.

27. The flexible pipe as claimed in claim 25, wherein said at least one profiled wire comprising two lateral flanges which protrudes from the second face of the base to thereby forming at least one second face channel.

28. The flexible pipe as claimed in claim 25, wherein said at least one profiled wire comprising two or more first face channels and/or two or more second face channels, said two or more first face channels and/or two or more second face channels being separated by a fence.

29. The flexible pipe as claimed in claim 28 wherein said fence has a height which is up to the height of the thickness of said edge sections of the folded strip(s).

30. The flexible pipe as claimed in claim 25, wherein said at least one profiled wire has a base thickness $T_{bw}$ defined by the distance between the first and the second face, said base thickness $T_{bw}$ being equal to or higher than the non-folded thickness $T_{ns}$ of the at least one folded metal strip to which it is engaged.

31. The flexible pipe as claimed in claim 25, wherein said at least one profiled wire has a base thickness $T_{bw}$ defined by the distance between the first and the second face, said base thickness $T_{bw}$ being 2 to 25 mm.

32. The flexible pipe as claimed in claim 25, wherein said protruding flanges of the at least one profiled wire each has a flange height defined by the protruding distance from the base, said flange height being equal to or less than the edge sections thickness $T_{fs}$.

33. The flexible pipe as claimed in claim 1, wherein said at least one folded metal strip being of metal.

34. The flexible pipe as claimed in claim 1, wherein said at least one profiled wire being of a material selected from composite materials and metals.

35. The flexible pipe as claimed in claim 1, wherein said at least one folded metal strip and said at least one profiled wire being of metal, said at least one folded metal strip being of a metal with a higher nobility than said at least one profiled wire.

36. The flexible pipe as claimed in claim 1, wherein said least one interlocked armouring layer being a traction armour layer.

37. The flexible pipe as claimed in claim 1, wherein said least one interlocked armouring layer being a pressure armouring layer.

38. The flexible pipe as claimed in claim 1, wherein said least one interlocked armouring layer being a carcass.

39. The flexible pipe as claims in claim 3, wherein $N_w = Y*N_s$ wherein Y is 1 or up to 100.

40. The flexible pipe as claims in claim 15, wherein said at lest one edge section protrudes in said folding direction.

41. The flexible pipe as claims in claim 26, wherein one edge section of one folded metal strip protrudes into said at least one channel and engages with one of the two lateral flanges, and one other edge section of one folded metal strip protrudes into said at least one channel and engages with the other one of the two lateral flanges.

42. The flexible pipe as claimed in claim 27, wherein one edge section of one folded metal strip protrudes into said at least one channel and engages with one of the two lateral flanges, and one other edge section of one folded metal strip protrudes into said at least one channel and engages with the other one of the two lateral flanges.

43. The flexible pipe as claimed in claim 1, wherein the at least one folded metal strip has a width in unfolded condition and a thickness, the width being at least 6 times the thickness.

44. The flexible pipe as claimed in claim 1, wherein the at least one profiled wire is an in principle endless unit with a pre-shaped non-folded cross sectional profile.

\* \* \* \* \*